United States Patent Office 3,029,134
Patented Apr. 10, 1962

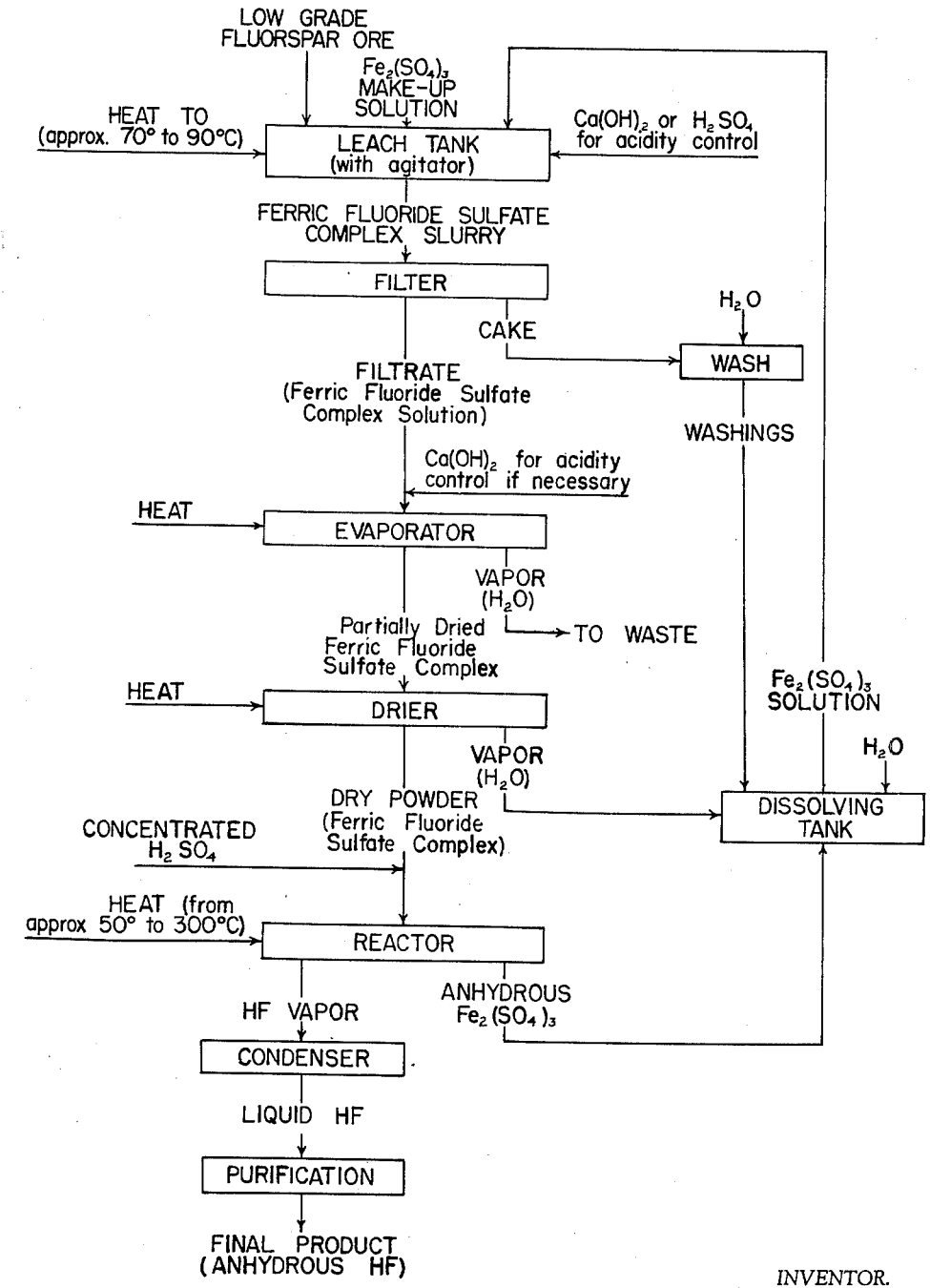

3,029,134
PROCESS FOR PRODUCING ANHYDROUS HYDROFLUORIC ACID
Paul B. Cardon, Salt Lake City, Utah, assignor to Minerals Refining Company, Murray, Utah, a corporation of Nevada
Filed Apr. 2, 1959, Ser. No. 803,611
9 Claims. (Cl. 23—153)

This invention relates to processes for producing hydrofluoric acid, especially from heretofore impractical or uneconomical sources such as low grade fluorspar ores.

Low grade fluorspar ores are relatively high in silica and lime. When treated by conventional processes utilizing sulfuric acid to decompose the ore, the silica is converted to silicon tetrafluoride ($SiF_4$) which results both in fluoride loss and in silica contamination of the final product. The lime consumes sulfuric acid to no useful purpose. Accordingly, high grade fluorspar (at least 97% $CaF_2$ content), commonly referred to as "acid grade," is universally employed for the industrial production of hydrofluoric acid. A common procedure in this respect is to heat a mixture of acid grade fluorspar with a slight excess of concentrated sulfuric acid to bring about the following reaction:

$$CaF_2 + H_2SO_4 \rightarrow 2HF + CaSO_4$$

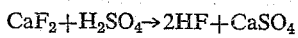

The reaction is ordinarily carried out in a rotary kiln at a temperature within the range of about 200 to 300° C.

A principal object of this invention is to provide an industrial process for the production of exceptionally high purity anhydrous hydrofluoric acid from low grade fluorspar ores, which process avoids formation of silicon tetrafluoride, wasteful consumption of sulfuric acid, and loss of fluorine by volatilization.

A feature of the invention is the use of ferric sulfate as a selective leaching and complexing agent for extraction of fluoride values from the fluorspar ore.

The use of ferric sulfate for this purpose has been recognized heretofore, see U.S. Patent No. 1,598,672 granted to Anson G. Betts on September 7, 1926. However, I have found that unless the free acid content of the leach solution is carefully controlled, silica is dissolved and not only shows up in the final product but causes a substantial loss of fluorine during purification procedures. Also, I have found that economic production of anhydrous hydrofluoric acid from the ferric fluoride sulfate solution resulting from the leaching phase of the process requires precautions against loss of fluoride during removal of the water.

One important factor preventing loss of fluoride during stages of the process subsequent to the initial leaching stage is the avoidance, in such initial leaching stage, of silica contamination of the complex solution by silicon fluorides, such avoidance being achieved by control of the free acid content of the leach solution, as explained above. Another factor is control of the free acid content of the complex leach solution which is evaporated for the removal of water.

An outstanding feature of the invention is evaporation of the complex leach solution to dryness prior to treatment of the complex for the production of hydrofluoric acid and anhydrous ferric sulfate. This enables production of the hydrofluoric acid in anhydrous form in a simple and economical manner.

One of the aspects of this invention which is essential from an economic standpoint is its cyclic nature, so far as the ferric sulfate is concerned. Thus, the ferric sulfate leaching agent is repeatedly placed in re-usable form as an incident in the production of the desired final product.

Another aspect having considerable practical importance is the control of temperature during the leaching stage, so that large and readily filterable crystals of calcium sulfate dihydrate (gypsum) are formed for easy elimination from the leach liquor by filtration.

Further objects and features of the invention will become apparent from the following detailed description of the specific procedures illustrated in the accompanying drawing, wherein the single FIGURE is a flow sheet representing presently preferred practice of the process.

In practice, the low grade fluorspar ore is ground to size suitable for leaching, e.g. 200 mesh, and is introduced into an open leach tank along with an aqueous solution of ferric sulfate. The tank should be constructed of corrosion-resistant material, such as glass, stainless steel, or rubber-lined metal, and provided with suitable means for moderate agitation of the leach material sufficient to keep the solids in suspension. Since the fluorine becomes tightly bound in the ferric fluoride sulfate complex, the precautions ordinarily taken with slightly acidic, aqueous solutions of fluoride salts need not be taken here. However, such materials as iron, steel, copper, and copper-containing alloys are unsuitable materials of construction for the leach tank, due to the corrosive action of the ferric sulfate solution.

The leaching step may be carried out in either single stage or countercurrent fashion, continuously or batchwise, and is preferably performed at a temperature above 70° and below 90° C. for a period of from about one-half hour to six hours, depending upon the particular ore, in order to insure growth of large and readily filterable crystals of gypsum, while providing a temperature high enough for a reasonable rate of reaction.

Such formation of large and readily filterable gypsum crystals, occurring under the circumstances of this process at a much higher temperature than ordinarily, for instance, in the "wet process" phosphoric acid industry, constitutes one of the features of the invention.

The fluorspar ore and ferric sulfate are ordinarily used in stoichiometric amounts based on the calcium fluoride content of the particular ore, although an excess of one or the other may be used without deleterious effects. In order to keep the amount of water to be removed in a subsequent step to a minimum and yet to have a leach solution which is fluid enough to be readily removed from the by-product gypsum, it is desirable that the strength of the ferric sulfate solution be approximately forty-five percent by weight of ferric sulfate and have a specific gravity of about 1.5. It should also be noted that the concentration of the ferric sulfate solution has an effect on gypsum crystal formation, and that the above-specified concentration is an optimum in this respect.

In accordance with the invention, the "free" acid content of the solution, i.e. acid other than that due to hydrolysis of ferric sulfate, must be neutralized. Both the commercial grade of ferric sulfate and that produced and re-cycled in the present process may contain a certain excess of free sulfuric acid. This acid will be neutralized to some degree by the lime in the ore. Depending on the lime content of the ore, an additional amount of either sulfuric acid or lime is added to adjust the acid content of the leach.

If there is acid present in the leach solution in addition to that due to hydrolysis of the ferric sulfate (due allowance being made for acid consumption by lime contained in the ore) an excessive amount of silica will be present in the hydrofluoric acid product. On the other hand, if some of the acid due to hydrolysis of the ferric sulfate is neutralized by lime in the ore, part of the iron will be precipitated and lost with the gypsum during filtration.

The acidity of the ferric sulfate reagent solution and that of the leach solution can be measured by a dilution technique, using direct pH measurement, or by conductometric titration. Since the acidity due to hydrolysis of pure ferric sulfate is known, the excess or deficiency measured can be corrected by the addition of lime or sulfuric acid, respectively.

It will be recognized that the pH of these solutions at the temperatures involved in leaching and drying will be different from that measured at room temperature, because of the change of the hydrolysis constant of water with temperature. The acidity specified for this process is based upon measurements made at room temperature.

When the ore has been leached for a sufficient time, the pregnant leach solution containing ferric fluoride sulfate complex is separated from the solid gypsum by filtration. The readily filtered gypsum crystals are then washed with water to recover adherent soluble fluorides and unreacted ferric sulfate, thus holding the loss of iron to less than three percent by weight of that present in any given cycle. As indicated, the wash liquor may be advantageously used to dissolve the ferric sulfate produced by the present process, so that it may be recycled as reagent solution for the leaching step.

The following examples are representative of numerous tests carried out with respect to the leaching phase of the process:

Example 1

In this test, no extraneous acid or base was present. Into a glass beaker was placed 75 cc. of water and 51.3 gm. of ferric sulfate hydrate analyzed to contain 78% $Fe_2(SO_4)_3$. The mixture was heated on a water bath to 85° C. and stirred mechanically. After the ferric sulfate had dissolved, 7.8 grams of pure calcium fluoride, ground to 200 mesh, was added, and the resulting slurry was stirred at 85° C. for three hours. This procedure formed relatively large (100 mesh) crystals of calcium sulfate dihydrate (gypsum), which were readily separated by suction filtration. The resulting filtrate was a solution of complex ferric fluoride sulfate, which, upon analysis, was found to contain 3.53 gm. of fluoride, or 93% of the fluorine originally present in the insoluble calcium fluoride. Thus, the fluorine was readily extracted from the insoluble calcium fluoride and solubilized as a complex salt by a simple leaching procedure.

Example 2

Using the procedure of Example 1 and the same quantities of reagents at a temperature of 70° C., an 86% extraction of the fluorine value was obtained. However, small gypsum crystals were produced, which were not readily filtered. Thus, the leaching temperature is an important factor with regard to obtaining ready separation of the waste gypsum crystals from the pregnant leach solution.

Example 3

Using the procedure of Example 1 and the same quantities of reagents at a temperature of 90° C. for three hours, 100% extraction of the fluorine into soluble form was obtained. However, again the gypsum crystals were smaller than desired for rapid separation from the leach solution by filtration.

Example 4

This test and that of Example 5 show the effect of excess acidity of the leach solution, as explained above, on the amount of silica solubilized during the leaching step. In a 500 ml. three-necked, round bottom flask equipped with a stirrer, thermometer, and condenser, 102.6 gms of the ferric sulfate hydrate of Example 1 was dissolved in 100 ml. of water. The solution was heated to 85° C., and an approximate 10% portion of a mixture of 17.9 gm. of $CaF_2$ and 3.0 gm. of $SiO_2$ was added. After the resulting suspension had been stirred for five minutes, the remainder of the mixture was added and the suspension was stirred for a further one and one-half hours at 85° C. The insoluble material was filtered by suction, washed with water, and the filtrate analyzed for fluoride and silica. The filtrate was found to contain 6.51 gm. of fluoride, corresponding to 85.7% extraction, and to contain 0.049% $SiO_2$.

Example 5

Example 4 was repeated with the exception that 2.0 gm. of concentrated $H_2SO_4$ was added to the ferric sulfate solution. Analysis of the resulting filtrate showed it to contain 5.28 gm. of fluoride, corresponding to 69.5% extraction, and to have a 0.203% $SiO_2$ content. Thus, the silica content of the leach was increased four fold by the addition of 0.02 mole of acid.

Example 6

This was a test conducted on a low grade fluorspar ore obtained from Bell Hill Mine, Juab County, Utah. This ore is presently noncommercial, due to its high lime and silica content. It cannot be economically upgraded by common techniques, such as flotation or gravity separation. The composition of the ore sample utilized was as follows:

| Compound: | Weight percent |
|---|---|
| $CaF_2$ | 71.8 |
| $CaCO_3$ | 23.8 |
| $SiO_2$ | 2.3 |
| $Fe_2O_3$ | 1.5 |
| Others | 0.6 |
| | 100.0 |

In carrying out the test, one liter of water was placed in a four liter stainless steel (type 304) beaker. The beaker was heated on a hot plate until the water temperature reached 70° C. While the water was vigorously stirred with a mechanical stirrer, 1030 gm. of commercial ferric sulfate hydrate was slowly added. When the ferric sulfate had dissolved, the temperature was raised to 80° C., and 192 gm. of the fluorspar ore was added in portions of about 20 gm., with gentle stirring. The temperature was maintained at 85–90° C. for three hours with continued stirring. The solution was then filtered by suction from the by-product gypsum. The filtrate was found to contain 60.7 grams of fluoride and the gypsum cake 6.0 grams of fluoride. Therefore, 90.4% of the fluoride in the ore was extracted by this leaching.

Example 7

This test was made on another non-commercial ore having a relatively low lime content and a relatively high silica content. The ore was obtained from a stockpile at the Quo Vadis mill, Delta, Utah. Its composition was as follows:

| Compound: | Weight percent |
|---|---|
| $CaF_2$ | 67.3 |
| $SiO_2$ | 22.4 |
| $CaCO_3$ | 9.5 |
| $Fe_2O_3$ | 1.5 |
| | 100.7 |

The leaching was carried out in a 180 gallon steel tank equipped with an efficient mechanical stirrer and a pipe extending nearly to the bottom of the tank, through which steam could be introduced for heating. Forty eight gallons of water were heated to 70° C., the agitator started, and 477.5 lbs. of commercial ferric sulfate added during a period of one hour. During this time, the temperature of the solution was brought up to 88° C. About one pound of ore was added in order to seed the solution with gypsum crystals. The remainder of the test sample of 90.25 lbs. of ore was added during the next forty five minutes, while maintaining the temperature at 86–88° C. The slurry was stirred for five hours after the addition of the ore was completed, and was then diluted to a volume of 87.5 gallons (specific gravity 1.6) for filtration. The slurry was filtered at about 45 lbs./sq. in. pressure through polyethylene filter cloth, and the resulting cake washed with 50 gallons of 85° C. water. Analysis of the cake showed it to contain 3.8 lbs. of fluoride and 2.8% $Fe_2O_3$. The wash water contained 0.26 lb. fluoride and 4.3% $Fe_2O_3$. The filtrate was found to contain 26.0 lbs. of fluoride and 0.041% $SiO_2$. Since the ore feed contained 29.6 lbs. fluoride, approximately 87% of the fluoride was extracted into soluble form by this treatment.

Following the leaching stage and the obtaining of a clear ferric fluoride sulfate complex solution by filtration of the leach solution, the next step in the process is to remove substantially all of the water from such leach liquor to produce a dry, solid complex of ferric fluoride sulfate. Removal of water from the complex solution and drying of the resulting solid are preferably effected by the action of heat at atmospheric or sub-atmospheric pressure by standard methods which are well known in the art. For example, a convenient two stage method is to use a vacuum evaporator followed by a rotary drier.

It is desirable that the acidity of such solution be adjusted, if necessary, by the addition of a base, such as lime or other material producing an insoluble neutralization product, so that the acid content due to hydrolysis of any uncomplexed ferric ion is neutralized. Reduction of the acid content to this level prevents excessive loss of hydrofluoric acid by volatilization during the evaporation and drying stages.

Removal of water and drying of the solid complex from the leach solution, which has been suitably adjusted with respect to acid content, does not present the corrosion problems encountered in evaporating dilute hydrofluoric acid solutions to produce anhydrous hydrofluoric acid, since the leach solution is substantially non-corrosive to glass even at elevated temperatures. Therefore, mild steel may be used as a material of construction for the evaporator and drier. Also, the azeotrope problems encountered in concentrating dilute hydrofluoric acid solutions are eliminated by concentrating the fluoride in the form of a ferric fluoride sulfate complex.

The following examples illustrate the effect of acidity of the leach liquor on retention of hydrofluoric acid during evaporation of the water:

*Example 8*

The evaporation of water was performed in a stainless steel container having two openings, one through which a stream of about 400 cc./min. of air was introduced and the other leading to a series of water and caustic scrubbers. A 100 ml. sample of leach solution containing 0.78 equivalent of acid per liter of solution was placed in the container, all connections were made tight, and the air stream was started. The container was heated in an oil bath, the temperature rising from 140° to 250° F. in the first hour. The temperature was held at 250° F. for one hour, and then at 300° F. for 75 minutes. Analysis of the total scrubber contents showed 0.85 gm. fluoride, and of the dried cake 2.06 gm. fluoride. The analysis of the original leach solution showed it to contain 2.80 gm. fluoride per 100 ml. Thus the fluorine loss during evaporation was 29.2%.

*Example 9*

The free acid content of another leach solution having an acid concentration of 0.39 equivalent per liter was reduced by the addition to a 110 ml. portion thereof, of 3.34 gm. NaOH(0.0835 equivalent). One hundred ml. of this adjusted solution was evaporated in the apparatus of Example 8 by heating at 250° F. for ninety minutes and then at 270° F. for two hours. Analysis of the combined scrubber solutions showed 0.15 gm. fluoride. The dried cake was found to contain 4.49 gm. fluoride. The fluoride content of the adjusted leach solution was found to be 4.71 gm. Therefore, the fluorine loss during evaporation was only 3.2%.

The last step of the process comprises generation of anhydrous hydrofluoric acid by reaction of concentrated sulfuric acid with the dried ferric fluoride sulfate complex. To this end, the dried complex, still containing as much of the heat as possible from the drying step, is well mixed with the stoichiometric amount of sulfuric acid. The mixture is introduced into a suitable reactor, such as that used in the conventional process for making anhydrous hydrofluoric acid, where it is heated to a temperature in the range of about 50° to 300° C. for a period of about 15 to 120 minutes in order to produce hydrofluoric acid and regenerate ferric sulfate, the latter being then recycled as indicated. The hydrogen fluoride vapors, now substantially free from water, are condensed purified, and packaged by well known procedures.

It can be seen by those skilled in the art that this method of generating hydrofluoric acid can be carried out at a lower temperature and with a shorter residence time than conventional methods, thereby, among its other advantages, resulting in more complete reaction and less difficulty from corrosion. The following examples will serve to illustrate the mildness and completeness of the reaction:

*Example 10*

The equipment used consisted of a 500 ml. cast iron pot having a removable lid equipped with an air inlet line, an air outlet line, and a water-cooled condenser on the air outlet line. One hundred grams of dried complex, which had been ground with a mortar and pestle, and 12.5 gm. of concentrated sulfuric acid were well mixed in a mortar; 87 gm. of this mixture were placed in the reactor, and the lid quickly applied and tightened. The remainder of the mixture was analyzed for fluoride. The analysis showed that the material charged to the reactor contained 2.85 gm. of fluoride. The mixture was heated at 145° to 150° C. for two hours. Due to the well known difficulty of condensing small quantities of hydrogen fluoride gas efficiently, the effectiveness of the reaction was measured by the amount of fluoride remaining in the cake. Analysis of the residue showed a content of 0.02 gm. fluoride. Thus, 99.3% of the fluoride was removed by this treatment.

*Example 11*

Using the apparatus of Example 10 and the same amounts of reagents, a charge of 83.5 gm. of the mixture was placed in the reactor. The mixture was heated at 190° C. for two hours. Fluoride analysis showed that the charge contained 2.74 gm. of fluoride and the residue 0.01 gm. Therefore, 99.7% of the fluoride was removed. The higher temperature had essentially no effect on fluoride removal, showing that the lower temperature of Example 10 was sufficient.

*Example 12*

Using the apparatus and amounts of Example 10, a charge of 85 gm. of the mixture was heated at 150° C. for one-half hour. Analysis showed the fluoride content of the charge to be 2.78 gm. and that of the residue 1.06 gm. Therefore, 63% of the fluoride was volatilized, a substantial quantity considering the short time of reaction and moderate temperature employed.

One of the outstanding features of the process is its cyclic nature. Thus, as indicated in the flow sheet, the anhydrous ferric sulfate resulting from the step of decomposing the ferric fluoride sulfate complex may be dissolved in water in a suitable tank and the resulting solution re-cycled to the leaching stage. An important advantage to this procedure is that aqueous washings from the gypsum filter cake may be used in dissolving the ferric sulfate and that $H_2O$ vapor from the drier used in the evaporation stage may be passed into the dissolving tank for scrubbing by the ferric sulfate solution.

This means that there is substantially no loss of either ferric sulfate or fluoride.

Whereas this process is here illustrated and described with respect to presently preferred practice thereof, it should be understood that various changes may be made by those skilled in the art without departing from the essential inventive teachings hereof.

I claim:

1. A process for producing anhydrous hydrofluoric acid from low grade fluorspar ores containing lime and silica, comprising leaching such a fluorspar ore with an aqueous solution of ferric sulfate whose free acid content is only substantially that which is produced by hydrolysis of the ferric sulfate and that which is consumed by lime contained in the ore, to produce a leach solution containing fluorine in the form of a ferric fluoride sulfate complex solution, together with a solid residue; separating the complex solution from the solid residue; testing said complex solution for acidity due to hydrolysis of uncomplexed ferric ions and, if such acidity exists, neutralizing same; removing substantially all of the water from said complex solution by evaporation to produce a dry, solid ferric fluoride sulfate complex containing substantially all of the fluoride leached from said ore; decomposing said solid complex with concentrated sulfuric acid in the presence of heat to produce a high grade anhydrous hydrofluoric acid substantially free of silica; and separating said hydrofluoric acid from said ferric sulfate.

2. The process of claim 1, wherein the leaching is carried out at an elevated temperature of approximately 85° centigrade to assure production of readily filterable gypsum crystals.

3. The process of claim 1, wherein the decomposition of the solid complex is carried out at a temperature within the range of about 50° to 300° centigrade.

4. A cyclic process for producing anhydrous hydrofluoric acid from low grade fluorspar ores containing lime and silica, comprising leaching such a fluorspar ore with an aqueous solution of ferric sulfate whose free acid content is only substantially that which is produced by hydrolysis of the ferric sulfate and that which is consumed by lime contained in the ore, to produce a leach solution containing fluorine in the form of a ferric fluoride sulfate complex solution, together with a solid residue; separating the complex solution from the solid residue; testing said complex solution for acidity due to hydrolysis of uncomplexed ferric ions and, if such acidity exists, neutralizing same; removing substantially all of the water from said complex solution by evaporation to produce a dry, solid ferric fluoride sulfate complex containing substantially all of the fluoride leached from said ore; decomposing said solid complex with concentrated sulfuric acid in the presence of heat to produce a high grade anhydrous hydrofluoric acid substantially free of silica and anhydrous ferric sulfate; dissolving said ferric sulfate in water; recycling the resulting ferric sulfate solution to the leaching stage; and repeating the specified procedure.

5. The process of claim 4, wherein adjustments to reduce acidity are carried out with a basic material which forms an insoluble neutralization product.

6. The process of claim 5, wherein the solid residue seperated from the complex solution is washed with water, and wherein the washings so obtained are used to dissolve the ferric sulfate for recycling.

7. The process of claim 6, wherein the evaporation stage is carried out by a first evaporation step and a second drying step; and wherein the vapor from said drying step is subjected to scrubbing by the recycle ferric sulfate solution.

8. The process of claim 4, wherein the leaching is carried out at an elevated temperature of approximately 85° centigrade to assure production of readily filterable gypsum crystals.

9. The process of claim 4, wherein the decomposition of the solid complex is carried out at a temperature within the range of about 50° to 300° centigrade.

References Cited in the file of this patent

UNITED STATES PATENTS

| | | |
|---|---|---|
| 782,321 | Brothers | Feb. 14, 1905 |
| 1,186,611 | Sadtler | June 13, 1916 |
| 1,598,672 | Betts | Sept. 7, 1926 |
| 1,962,887 | Ashley | June 12, 1934 |
| 2,851,335 | Heinerth | Sept. 9, 1958 |